United States Patent
Isaac et al.

(10) Patent No.: US 8,874,810 B2
(45) Date of Patent: *Oct. 28, 2014

(54) SYSTEM AND METHOD FOR READ DATA BUFFERING WHEREIN ANALYZING POLICY DETERMINES WHETHER TO DECREMENT OR INCREMENT THE COUNT OF INTERNAL OR EXTERNAL BUFFERS

(75) Inventors: Roger Dwain Isaac, Campbell, CA (US); Seiji Miura, Tokyo (JP)

(73) Assignee: Spansion LLC, Sunnyvale, CA (US)

( * ) Notice: Subject to any disclaimer, the term of this patent is extended or adjusted under 35 U.S.C. 154(b) by 448 days.

This patent is subject to a terminal disclaimer.

(21) Appl. No.: 12/276,143

(22) Filed: Nov. 21, 2008

(65) Prior Publication Data

US 2009/0138624 A1 May 28, 2009

Related U.S. Application Data

(60) Provisional application No. 61/004,434, filed on Nov. 26, 2007, provisional application No. 61/004,362, filed on Nov. 26, 2007, provisional application No. 61/004,412, filed on Nov. 26, 2007, provisional application No. 61/004,361, filed on Nov. 26, 2007.

(51) Int. Cl.
*G06F 13/16* (2006.01)

(52) U.S. Cl.
USPC .................. 710/56; 710/19; 710/52; 710/53; 710/22; 711/118; 711/158; 711/167

(58) Field of Classification Search
USPC ............ 710/8–10, 52–54, 5, 22–25; 711/158; 711/167, 5, 118; 370/351
See application file for complete search history.

(56) References Cited

U.S. PATENT DOCUMENTS

| | | | | |
|---|---|---|---|---|
| 6,678,749 B2 * | 1/2004 | Kolli et al. | | 710/5 |
| 6,928,528 B1 * | 8/2005 | Hewitt | | 711/156 |
| 7,120,743 B2 * | 10/2006 | Meyer et al. | | 711/118 |
| 7,181,659 B2 * | 2/2007 | Bravo et al. | | 714/718 |
| 7,200,137 B2 * | 4/2007 | Dorr et al. | | 370/351 |
| 7,412,574 B2 * | 8/2008 | Jeddeloh | | 711/158 |
| 7,512,762 B2 * | 3/2009 | Gower et al. | | 711/167 |
| 7,966,443 B2 * | 6/2011 | Grundy et al. | | 711/5 |
| 8,732,360 B2 * | 5/2014 | Isaac et al. | | 710/56 |

(Continued)

FOREIGN PATENT DOCUMENTS

| | | | |
|---|---|---|---|
| JP | 2007-526559 A | | 9/2007 |
| WO | WO2007-002546 A2 | | 4/2007 |
| WO | WO2007-060250 A1 | | 5/2007 |

OTHER PUBLICATIONS

PCT Report dated Jun. 10, 2010; Notification.

(Continued)

*Primary Examiner* — Tammara Peyton

(57) ABSTRACT

Efficient and convenient storage systems and methods are presented. In one embodiment a storage system includes a plurality of storage nodes and a master controller. The storage nodes store information. The storage node includes an upstream communication buffer which is locally controlled at the storage node to facilitate resolution of conflicts in upstream communications. The master controller controls the flow of traffic to the node based upon constraints of the upstream communication buffer. In one embodiment, communication between the master controller and the node has a determined maximum latency. The storage node can be coupled to the master controller in accordance with a chain memory configuration.

16 Claims, 5 Drawing Sheets

(56) References Cited

U.S. PATENT DOCUMENTS

| | | |
|---|---|---|
| 2004/0024948 A1 | 2/2004 | Winkler et al. |
| 2004/0139286 A1 | 7/2004 | Lin et al. |
| 2005/0086441 A1 | 4/2005 | Meyer et al. |
| 2005/0149774 A1 | 7/2005 | Jeddeloh et al. |
| 2005/0177677 A1 | 8/2005 | Jeddeloh |
| 2006/0095701 A1 | 5/2006 | Gower et al. |
| 2006/0179262 A1 | 8/2006 | Brittain et al. |
| 2007/0005922 A1* | 1/2007 | Swaminathan et al. ...... 711/167 |

OTHER PUBLICATIONS

PCT Report dated Jun. 10, 2010;International Preliminary Report on Patentability.

PCT Report dated Nov. 26, 2007; Written Opinion.

* cited by examiner

SYSTEM AND METHOD FOR READ DATA BUFFERING WHEREIN ANALYZING POLICY DETERMINES WHETHER TO DECREMENT OR INCREMENT THE COUNT OF INTERNAL OR EXTERNAL BUFFERS

RELATED APPLICATIONS

This Application claims the benefit of and priority to the following Provisional Applications:

U.S. Provisional Application No. 61/004,434, filed Nov. 26, 2007, entitled "A STORAGE SYSTEM AND METHOD", U.S. Provisional Application No. 61/004,362, filed Nov. 26, 2007, entitled "A SYSTEM AND METHOD FOR ACCESSING MEMORY,", U.S. Provisional Application No. 61/004,412, filed Nov. 26, 2007, entitled "A METHOD FOR SETTING PARAMETERS AND DETERMINING LATENCY IN A CHAINED DEVICE SYSTEM", and U.S. Provisional Application No. 61/004,361, filed Nov. 26, 2007, entitled "SYSTEMS AND METHODS FOR READ DATA BUFFERING", which are incorporated herein by this reference.

This Application is also related to the following co-pending Applications:

U.S application Ser. No. 12/276,010, entitled "A SYSTEM AND METHOD FOR ACCESSING MEMORY," filed on Nov. 21, 2008, U.S. application Ser. No. 12/276,061, entitled "A METHOD FOR SETTING PARAMETERS AND DETERMINING LATENCY IN A CHAINED DEVICE SYSTEM" filed on Nov. 21, 2008, and U.S. application Ser. No. 12/276,116, entitled "SYSTEMS AND METHODS FOR READ DATA BUFFERING", filed on Nov. 21, 2008, which are incorporated herein by this reference.

TECHNICAL FIELD

This invention relates generally to a system of networked devices and control methods thereof, and more particularly, to a system of networked devices having a master controller and a node and a control method thereof.

BACKGROUND OF THE INVENTION

Electronic systems and circuits have made a significant contribution towards the advancement of modern society and are utilized in a number of applications to achieve advantageous results. Electronic technologies such as digital computers, calculators, audio devices, video equipment, and telephone systems have facilitated increased productivity and reduced costs in analyzing and communicating data, ideas and trends in most areas of business, science, education and entertainment. Frequently, the electronic systems designed to provide these results include memories. However, accessing memory resources in a fast and efficient manner can involve complicated protocols.

Numerous electronic devices include processors that operate by executing software comprising a series of instructions for manipulating data in the performance of useful tasks. The instructions and associated data are typically stored in a memory. Memories usually consist of a location for storing information and a unique indicator or address. The utility a device provides often depends upon the speed and efficiency at which instructions are executed. The ability to access a memory and transfer information quickly and conveniently usually has a significant impact on information processing latency. The configuration of a memory usually affects the speed at which memory locations are accessed.

Traditional attempts at memory control are often very convoluted and complex. HyperTransport and similar protocols generally operate according to a multi-drop bus model and use a token exchange protocol to manage network traffic between devices in the system. With these protocols, communication traffic (in the form of data and/or requests) is scheduled through the exchange and accounting of tokens, the tokens referring to segments of available resources. Utilization of a protocol such as this generally produces inefficiency and overhead with regards to the number of buffers required in the system by requiring more buffers available than what is actually necessary for the individual device to function to protect from overloading the devices and a subsequent loss of data. Such protocols also suffer from inefficiency and overhead in regards to latency and available bandwidth throughout the system, which can result in issues with scheduling due to unknown traffic patterns and limited resources. As a result of these inefficiencies, the system becomes non-optimal and non-deterministic.

Furthermore, the network of a computer system utilizing a contemporary network traffic management model (e.g. a multi-drop bus) to communicate requests and transfer data between devices will generally have a fixed bandwidth, but a variable latency, and at any time during a customary operating cycle will have an unknown number of requests in the network. As such, the ability to schedule an unknown number of requests to maximize the efficiency of the network becomes difficult for the scheduling controller. The indeterminate latency also has the effect of creating very long average latencies in the network, requiring complex control mechanisms or large buffer sizes, or combinations of the above, to manage the traffic effectively. Furthermore, loading and signal integrity limitations of standard multi-drop bus models employed in conventional approaches limit the capacity and speed of the network. Additional protocol limitations may restrict the types of devices that are allowed to utilize the bus.

Conventional chain systems (also referred to as a "daisy chain type systems") attempt to address problems associated with multi-drop capacity and speed. However, conventional daisy chain systems often greatly increase the overall complexity, power consumption, and manageability of the system relative to a multi-drop bus model. In addition traditional chain systems usually encounter performance tradeoff issues between e latency and effective bandwidth in which reduced buffer sizes usually degrade bandwidth of the system and larger buffer sizes give rise to a corresponding increase in latency.

Furthermore, there are issues with scheduling efficiently in a typical daisy chain system. The controller in a daisy chain type system must account for scheduling constraints on each device for the entire system and cumulative scheduling impacts result in complex or unwieldy scheduling patterns. Typical daisy chain models also often employ an additional timestamp protocol within each device. The timestamps tell the device when, relative to each device, the device should perform the received commands internally. However, the protocol required for timestamping further adds to the complexity of the system, as each device is required to individually account for the timestamps and provide a queue for the requests the device has waiting to issue. However, as the queue is locally managed in the individual node it is not controllable by the system controller and the system controller is not able to accurately account for delays due to local management.

SUMMARY OF THE INVENTION

Efficient and convenient storage systems and methods are presented. In one embodiment a storage system includes a plurality of storage nodes and a master controller. The storage nodes store information. The storage node includes an upstream communication buffer which is locally controlled at the storage node to facilitate resolution of conflicts in upstream communications. The master controller controls the flow of traffic to the node based upon constraints of the upstream communication buffer. In one embodiment, communication between the master controller and the node has a determined maximum latency. The storage node can be coupled to the master controller in accordance with a chain memory configuration.

DETAILED DESCRIPTION

Figure 1:
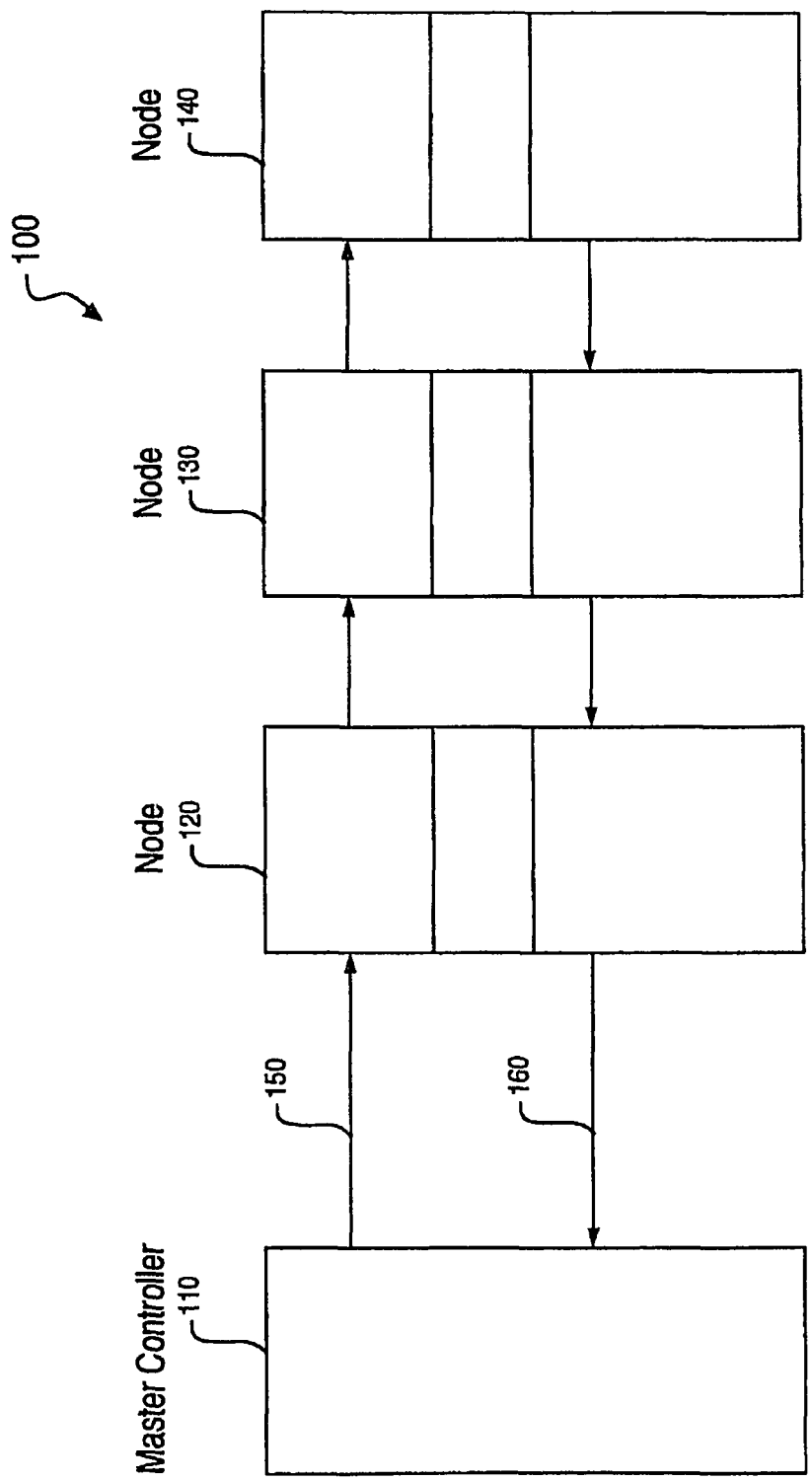
FIG. 1 is a block diagram of an exemplary storage system in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

FIG. 1 is a system block diagram of a storage system 100 in accordance with one embodiment of the present invention. The system 100 in FIG. 1 includes a master controller 110; a plurality of nodes 120, 130 and 140; a downstream communication bus 150 and an upstream communication bus 160. Downstream communication bus 150 and an upstream communication bus 160 communicatively couple master controller 110 and the plurality of nodes 120, 130 and 140. In one embodiment, the nodes 120, 130 and 140 are coupled to the master controller 110 in accordance with a chain memory configuration.

The components of storage system 100 cooperatively operate to efficiently and conveniently store information. Nodes 120, 130 and 140 store information. Master controller 110 controls the flow of traffic to the nodes based upon constraints of upstream communication buffers within the nodes 120, 130 and 140. In one exemplary implementation, the master controller schedules the issuing of commands so that the capacity of a communication buffers (e.g., read buffers) of a node are not exceeded. The master controller can also schedule commands such that the total available read bandwidth of the links in the chain is not exceeded. In one embodiment, communication between the master controller and the nodes has a determined maximum latency. Downstream communication bus 150 communicates information towards the nodes 120, 130, 140 and away from the master controller 110. Upstream communication bus 160 communicates information towards the master controller 110 and away from the nodes 120, 130, and 140.

In one embodiment, the master controller 110 issues commands to the node in accordance with timing characteristics of the individual node and irrespective of the position of the node in the system, or other nodes within the system. In one exemplary implementation, the master controller 110 has unilateral control over the node 120, 130 and 140 and schedules the commands in a scheme that facilitates simulation of some aspects of a multi-drop bus hierarchy with a fixed latency on a chain configuration hierarchy. The simulation of multi-drop aspects in a chained system enables realization of benefits of both chained and multi-drop configurations.

In one embodiment, the master controller 110 includes a downstream interface, a logic component and an upstream interface. The downstream interface includes buffers for temporarily storing or buffering commands awaiting communication on downstream bus 150. The logic component directs scheduling of the commands on the downstream communication path. The upstream interface is for receiving responses and other information being communicated to the master controller. In one embodiment, the logic component analyzes the information sent out via the downstream interface and information received via the upstream interface to ensure that buffers of nodes in the chained system are not exceeded.

It is appreciated the master controller can have a variety of implementations. In one embodiment, the master controller is implemented in a central processing component (CPU). In one exemplary implementation the master controller can serve as a Direct Memory Access (DMA) engine.

In one embodiment, nodes 120, 130 and 140 locally manage scheduling of communications from the node. In one exemplary implementation, the node forwards commands not targeted to the node downstream. Locally managing scheduling of communications from the node includes selection of an external request response or an internal request response for forwarding on an upstream interface of the node in one exemplary implementation. It is appreciated the locally managed scheduling of the upstream communications can involve a variety of priority considerations. In one exemplary implementation, the continuation of "external" upstream communications is given priority over "internal" upstream communications. Priority of upstream communications can be assigned on a round robin bases between internally constructed responses and externally constructed responses.

Figure 2:
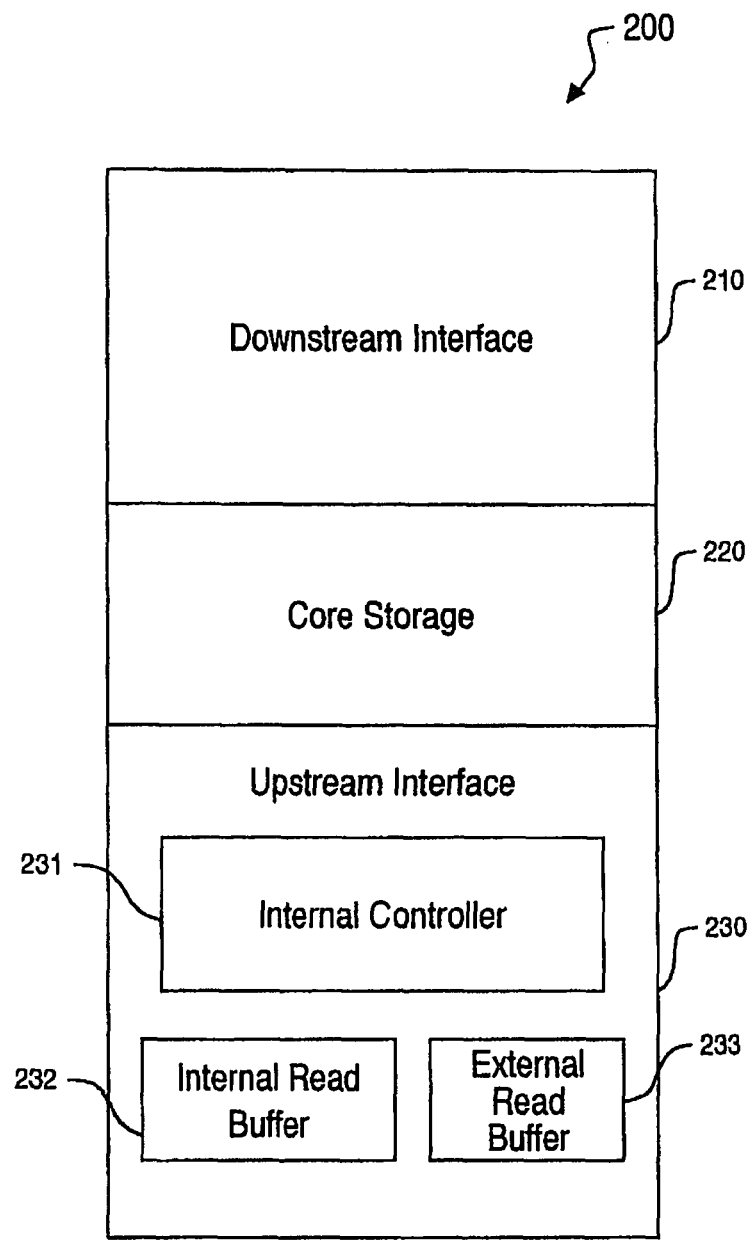
FIG. 2 is a block diagram of an exemplary node in accordance with various embodiments of the present invention.

FIG. 2 is a block diagram of exemplary node 200 in accordance with various embodiments of the present invention. In one embodiment, exemplary node 200 is similar to nodes 120, 130 and 140. Node 200 includes a downstream interface 210, a storage core 220 and an external interface 230. Downstream interface 210 is coupled to an external bus carrying commands downstream away from a master controller. The storage core 220 stores data. In one embodiment, the storage core 220 includes flash memory components arranged in bitlines and wordlines. The upstream interface 230 is coupled to an external bus carrying data in the direction upstream towards an external master controller.

In one embodiment, the upstream terminal includes an internal controller 231, an internal read buffer 232 and an external read buffer 233. The internal read buffer 231 and external read buffer 232 help prevent read data from being lost because of contention on the upstream bus. Internal read buffer 232 buffers information from within the node awaiting communication upstream. External read buffer 233 buffers information received from another node awaiting communication upstream. Internal controller 231 controls scheduling of upstream communication of information from the node, including information buffered in the internal read buffer and the external read buffer. In one exemplary implementation, the internal controller 231 manages the read buffers and empties the contents on the first available upstream read slot.

Figure 3:
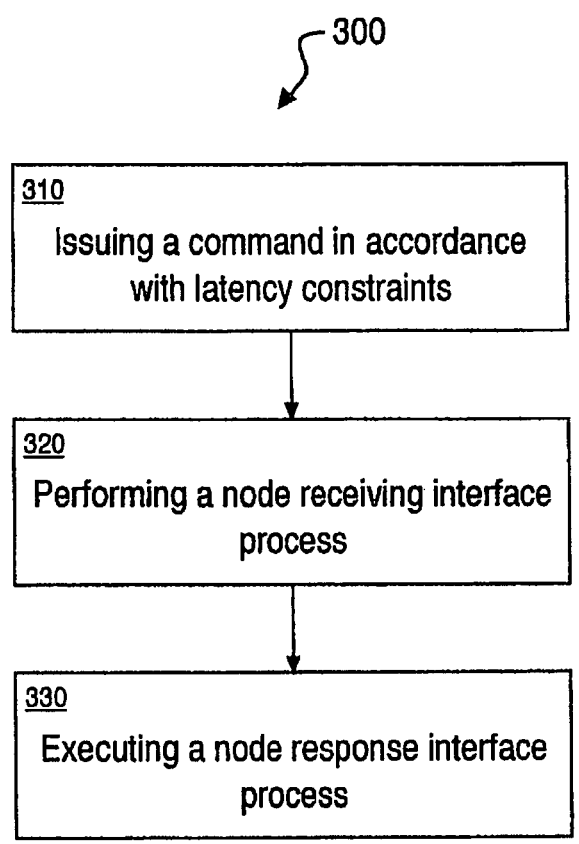
FIG. 3 is a flow chart of an exemplary storage method in accordance with one embodiment of the present invention.

FIG. 3 is a flow chart of storage method 300 in accordance with one embodiment of the present invention. In one embodiment, storage method 300 is implemented in a storage system with a plurality of nodes organized in a chain configuration. In one exemplary implementation, storage method 300 can be implemented on storage system 200.

In block 310 a command is issued in accordance with latency constraints. In one embodiment, wherein the latency constraints include performing the issuing of a command so that total available read bandwidth of links of a plurality of nodes in a chain is not exceeded and read buffer capacity of the plurality of nodes is not exceeded. In one exemplary implementation, the issuing a command is performed in accordance with characteristics of a targeted node without concern for a location of the node in a network or concern for characteristics of other nodes in the network.

In block 320 a node receiving interface process is performed on the command at a node. In one embodiment, the node receiving interface process facilitates organized downstream communication of commands. In one exemplary implementation, the node receiving interface process operates similar to simulation of operations in a multi drop configuration.

In block 330 a node response process corresponding to the command is executed if the command is targeted at the node. In one embodiment the node response process retrieves response information to be forwarded upstream to a master controller. The forwarding of upstream information is performed to avoid conflicts in internally retrieved information and information externally received for further communication upstream. In one exemplary implementation, the read information is forwarded upstream on the first available slot.

Figure 4:
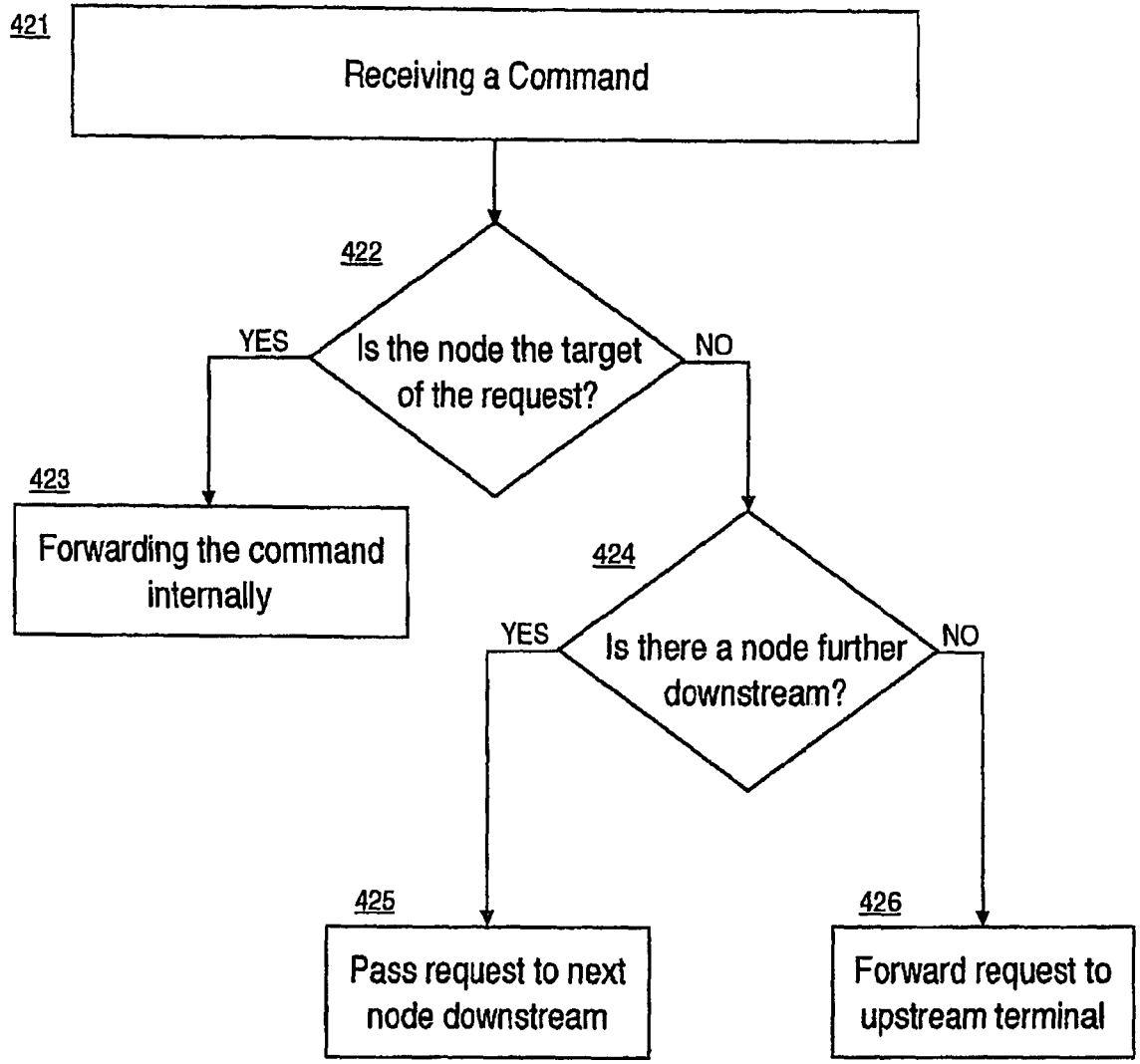
FIG. 4 is a flow chart of an exemplary node receiving interface process in accordance with one embodiment of the present invention.

FIG. 4 is a flow chart of node receiving interface process 420 in accordance with one embodiment of the present invention. In one embodiment, node receiving interface 420 is similar to the node receiving interface process performed in block 320.

In block 421 a command is received. In one embodiment, the command is received from an external controller. In one exemplary implementation the command is received on a downstream bus.

At block 422 a determination is made whether the node is the target of the command. In one exemplary implementation, information stored in the node is the target of the command. For example, a read command is directed to reading information at an address associated with a storage location within a node.

The command is forwarded internally within the node if the node is the target of the command at block 423. In one embodiment, the command is forwarded to a node response process to be executed.

In block 424 a determination is made if there is a node further downstream.

At block 425 the command is passed downstream if the node is not the target of the command and there is a node downstream.

In one embodiment, an invalid request is forwarded upstream in block 426 if the node is not the target of the request and there are no nodes further downstream.

Figure 5:
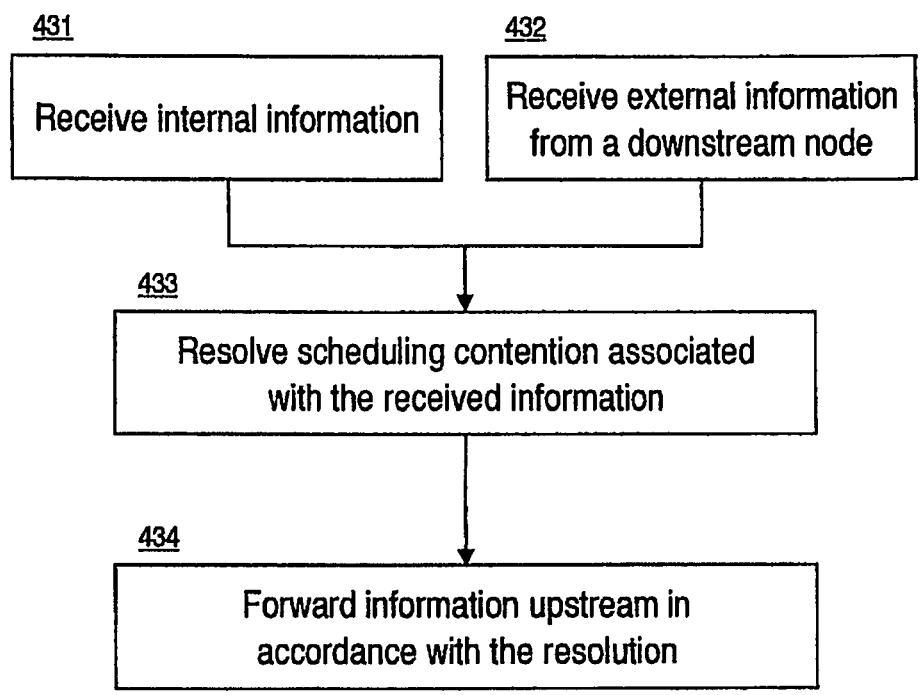
FIG. 5 is a flow chart of an exemplary upstream communication conflict resolution process in accordance with one embodiment of the present invention.

FIG. 5 is a flow chart of upstream communication conflict resolution process 430 in accordance with one embodiment of the present invention. In one embodiment, upstream communication conflict resolution process 430 is performed at block 330 to prevent conflicts in upstream communications. In one exemplary implementation, upstream communication conflict 430 is performed by upstream communication interface 230.

At block 431, internal information associated with internal operations is received. In one embodiment, the internal information is a read request response information retrieved from a storage location within the node.

At block 432 external information is received. In one embodiment, the external information is received from a downstream node.

In block 433 scheduling contentions or timing conflicts associated with the received internal information and external information are resolved. In one embodiment, the resolution involves assigning priorities to information in the internal read buffer and the external read buffer. In one embodiment, priority is determined in a round robin fashion. In another embodiment, the timing conflicts are resolved by a default awarding priority to information received in the external read buffer. The information is forwarded upstream according to the determined priorities.

In one embodiment, a lightweight node access protocol is utilized to allow a chained memory configuration to utilize existing controller with slight modifications. In the case of non-fixed latency nodes (e.g., NAND memory, hard drives, etc.) a master controller can issue an encoded command to begin the read and poll the node until the read data is available, or wait for an interrupt from the node to start the read. The read is then a known latency from a buffer inside the non-fixed latency node.

The lightweight node access protocol can also be utilized in schemes in which there are allocated slots on a read data bur fro autonomous transfers of data or commands from the nodes in the upstream direction (toward a master controller). In one exemplary implementation the master controller is allowed to serve as a DMA engine and write directly to the master controller in response to DMA requests.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A storage system comprising:
 a node of a plurality of nodes for storing information, wherein the node includes an upstream communication buffer; and
 a master controller for controlling the flow of traffic to the node based upon constraints of the upstream communication buffer such that scheduling of buffered commands through a downstream interface of said master controller on a downstream communication path from said master controller to said plurality of nodes is configured to ensure that buffers of said plurality of nodes are not exceeded by analyzing information sent from said master controller to said plurality of nodes via said downstream interface and by analyzing information received by said master controller from said plurality of nodes over an upstream communication path via an upstream interface, wherein said buffered commands are temporarily stored at said master controller, wherein communication between the master controller and the node has a determined maximum latency; and wherein a plurality of nodes including the node is coupled to the master controller in accordance with a chain memory configuration; and wherein said master controller is configured for tracking a state of a buffer count of said node when performing said analyzing information by decrementing said buffer count when a request that involves a response is forwarded to said node and incrementing said buffer count when a request response is received from said node.

2. The storage system as claimed in claim 1 wherein the master controller forwards commands to the node and wherein the node executes the command if the node is the target of the command, and the node passes the command to another node if the node is not the target of the command.

3. The storage system as claimed in claim 1 wherein the master controller schedules the commands in a scheme that facilitates simulation of a multi-drop bus hierarchy with a fixed latency.

4. The storage system as claimed in claim 1 wherein the master controller issues commands to the node in accordance with timing characteristics of the individual node and irrespective of the position of the node in the system and other nodes within the system.

5. The storage system as claimed in claim 1 wherein the master controller schedules read commands so that the total available read bandwidth of a link in the chain is not exceeded and upstream interface buffers of the node are not exceeded.

6. The storage system as claimed in claim 1 wherein the node further comprises:
 a downstream interface for coupling with a bus carrying data in the direction away from the master controller;
 a core storage section for the storage of data; and
 an upstream interface for coupling with a bus carrying data in the direction towards the master controller.

7. The storage system as claimed in claim 6 wherein the upstream terminal of the node further comprises:
 an internal read buffer for buffering information from within the node awaiting communication upstream;
 an external read buffer for buffering information received from another node awaiting communication upstream; and
 an internal controller for controlling scheduling of upstream communication of information buffered in the internal read buffer and the external read buffer.

8. The storage system as claimed in claim 1 wherein the node locally manages scheduling of communications from the node, wherein the scheduling includes selection of an external request response or an internal request response for forwarding from an upstream interface of the node.

9. The storage system as claimed in claim 1 wherein the master controller can serve as a Direct Memory Access (DMA) engine.

10. A storage method comprising:
 issuing a command in accordance with latency constraints, such that scheduling of buffered commands through a downstream interface of a master controller on a downstream communication path from said master controller to said plurality of nodes is configured to ensure that buffers of a plurality of nodes receiving commands are not exceeded by analyzing information sent from said master controller to said plurality of nodes via said downstream interface and by analyzing information received by said master controller from said plurality of nodes over an upstream communication path via an upstream interface, wherein said buffered commands are temporarily stored at said master controller, wherein said buffered commands are temporarily stored at said master controller, wherein communication between the master controller and the node has a determined maximum latency; and wherein a plurality of nodes including the node is coupled to the master controller in accordance with a chain memory configuration; and wherein said master controller is configured for tracking a state of a buffer count of said node when performing said analyzing information by decrementing said buffer count when a request that involves a response is forwarded to said node and incrementing said buffer count when a request response is received from said node;

performing a node receiving interface process on the command at a node; and executing a node response process corresponding to the command if the command is targeted at the node.

11. The storage method of claim 10 wherein the node is one of a plurality of nodes organized in a chain configuration.

12. The storage method of claim 11 wherein the latency constraints include performing the issuing of a command so that total available read bandwidth of links of the plurality of node in the chain configuration is not exceeded and read buffer capacity of the plurality of nodes is not exceeded.

13. The storage method of claim 10 wherein the issuing a command is performed in accordance with characteristics of a targeted node without concern for a location of the node in a network or concern for characteristics of other nodes in the network.

14. The storage method of claim 10 wherein the performing a node receiving interface process comprises:

receiving the command from an external controller;
determining whether the node is the target of the command;
passing the node downstream if the node is not the target of the command; and
forwarding the command internally within the node if the node is the target of the command.

15. The storage method of claim 10 wherein executing a node response process comprises:

performing internal operations associated with the command; and
forwarding the results of the internal operations upstream in accordance with a conflict resolution process for handling conflicts with upstream information received from other nodes.

16. The storage method of claim 10 wherein executing a node response process comprises determining scheduling upstream communication priorities between information in an internal read buffer and an external read buffer according to a pre-determined algorithm for accessing the upstream communication bus by the internal read buffer and the external read buffer.

* * * * *